United States Patent
Nakajima et al.

(10) Patent No.: US 7,334,027 B2
(45) Date of Patent: *Feb. 19, 2008

(54) CONTROLLING METHOD, COMPUTER SYSTEM, AND PROCESSING PROGRAM OF BOOTING UP A COMPUTER

(75) Inventors: Takao Nakajima, Yokohama (JP);
Yoshifumi Takamoto, Kokubunji (JP);
Kouji Masuda, Yokohama (JP);
Keisuke Hatasaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/759,101

(22) Filed: Jun. 6, 2007

(65) Prior Publication Data

US 2007/0214387 A1    Sep. 13, 2007

(51) Int. Cl.
*G06F 15/16* (2006.01)
(52) U.S. Cl. .............. 709/221; 709/224; 714/13
(58) Field of Classification Search ........ 709/200–203, 709/217–224; 714/2, 9, 13
See application file for complete search history.

(56) References Cited

U.S. PATENT DOCUMENTS

| | | | |
|---|---|---|---|
| 5,771,354 A | 6/1998 | Crawford | |
| 5,852,724 A | 12/1998 | Glenn, II et al. | |
| 6,119,162 A | 9/2000 | Li et al. | |
| 6,260,120 B1 | 7/2001 | Blumenau et al. | |
| 6,578,158 B1 | 6/2003 | Deitz et al. | |
| 6,735,692 B1 | 5/2004 | Murphrey et al. | |
| 6,754,718 B1 * | 6/2004 | Dobberpuhl et al. ........ 709/250 |
| 6,944,785 B2 | 9/2005 | Gadir et al. | |
| 7,200,869 B1 | 4/2007 | Hacherl et al. | |
| 7,216,258 B2 * | 5/2007 | Ebsen et al. ................... 714/33 |
| 7,240,234 B2 | 7/2007 | Morita et al. | |
| 7,260,737 B1 * | 8/2007 | Lent et al. ..................... 714/5 |
| 2002/0091805 A1 | 7/2002 | Phillips et al. | |
| 2004/0059816 A1 | 3/2004 | Takaoka et al. | |

(Continued)

FOREIGN PATENT DOCUMENTS

WO    WO 98/41916    9/1998

OTHER PUBLICATIONS

Holland, et al., BladeCenter Storage, IBM J. Res. & Dev., vol. 49, No. 6, Nov. 2005, pp. 921-939.

(Continued)

*Primary Examiner*—Moustafa Meky
(74) *Attorney, Agent, or Firm*—Antonelli, Terry, Stout & Kraus, LLP.

(57) ABSTRACT

Respective WWNs (World Wide Names) which can be allocated to a plurality of computers, business application identity information of programs to be booted and area identity information, of areas in a storage system in which the programs are stored, are associated and stored. In response to the entry of a boot request including the business application identity information of a designated computer to be booted, the WWN and the area identity information corresponding to the business application identity information are sent to the computer in order to boot the program. In the computer, the sent WWN is set and the area identity information is set as the area to be booted. Subsequently, by means of a restart of the computer, the program stored in the area is booted to operate.

18 Claims, 9 Drawing Sheets

U.S. PATENT DOCUMENTS

| | | |
|---|---|---|
| 2004/0194984 A1* | 10/2004 | Firdaus ....................... 172/518 |
| 2004/0249858 A1 | 12/2004 | Nakagawa et al. |
| 2005/0010918 A1 | 1/2005 | Childs et al. |
| 2006/0047852 A1 | 3/2006 | Shah et al. |
| 2006/0075217 A1 | 4/2006 | Takamoto et al. |
| 2006/0092861 A1 | 5/2006 | Corday et al. |
| 2006/0155749 A1 | 7/2006 | Shankar et al. |
| 2006/0230220 A1* | 10/2006 | Yasuda et al. .............. 710/316 |
| 2007/0055853 A1 | 3/2007 | Hatasaki et al. |
| 2007/0073875 A1* | 3/2007 | Goto et al. ................. 709/224 |

OTHER PUBLICATIONS

US 7,278,054, 10/2007, Davies et al. (withdrawn)*

* cited by examiner

FIG.3

DISK MANAGEMENT PART 130

DISK MAPPING TABLE 132

| WWN | LOGICAL DISK NUMBER | PHYSICAL DISK NUMBER |
|---|---|---|
| WWNS1 | LUN0 | LU10 |
| WWNS2 | LUN1 | LU11 |
| WWNS3 | LUN3 | LU17 |
| WWNS4 | LUN0 | LU21 |
|  | LUN1 | LU22 |
| WWNS5 | LUN0 | LU31 |
|  | LUN1 | LU32 |
|  | LUN2 | LU33 |
| WWNS6 | LUN4 | LU41 |

FIG.4

BOOT DISK MANAGEMENT PART 111

BOOT MANAGEMENT TABLE 113

| BUSINESS ID | HBA INFORMATION WWN | BOOT DISK INFORMATION LOGICAL DISK NUMBER |
|---|---|---|
| P1 | WWNS1 | LUN0 |
| P2 | WWNS2 | LUN1 |
| P3 | WWNS3 | LUN3 |
| P4 | WWNS4 | LUN0 |
| P5 | WWNS4 | LUN2 |
| P6 | WWNS4 | LUN4 |

FIG.5

SERVER MANAGEMENT PART 110

SERVER MANAGEMENT TABLE 114

| SERVER ID | EXECUTED BUSINESS ID | HBA INFORMATION | BIOS INFORMATION |
|---|---|---|---|
| | | SETTING WWN | BOOT LOGICAL DISK NUMBER |
| S1 | P3 | WWNS3 | LUN3 |
| S2 | P1 | WWNS2 | LUN1 |
| S3 | P4 | WWNS4 | LUN2 |
| S4 | — | — | — |

CONTROLLING METHOD, COMPUTER SYSTEM, AND PROCESSING PROGRAM OF BOOTING UP A COMPUTER

INCORPORATION BY REFERENCE

The present application claims priority from U.S. application Ser. No. 11/366,560 (still pending) filed on Mar. 3, 2006, which claims priority from Japanese application JP2005-357118 filed on Dec. 12, 2005. The contents of all of the above-identified is hereby incorporated by reference into this application.

BACKGROUND OF THE INVENTION

The present invention pertains to boot technology for booting a program executed on a computer.

Generally, in computer systems equipped with a disk device, there is adopted a method wherein the Operating System (OS) of a computer is installed on a boot disk within the disk device, the boot disk is discovered at the time of starting (activating) the computer, and the operating system stored on the boot disk is booted.

As one piece of prior art, there is the method of booting from a disk built into the computer.

In this method, it is possible to boot the computer by preparing a disk device for installing the operating system in the computer in advance and installing the operating system on the same disk. Only one boot disk (the disk on which the OS to be booted is stored) exists for the computer and also, the boot disk is not shared by other computers. Consequently, it is a method with high security in which there is a low possibility that a reference or an update is carried out from another computer with respect to the boot disk.

On the other hand, there is the method of booting from an external disk array or equivalent.

A disk array possesses large-scale capacity and can connect multiple computers via a Fibre Channel and a Fibre Channel switch. In case the OS is booted from an external disk like a disk array device, there are issues with security. Disk array devices can consult or update disks inside the disk array devices from all the connected computers, basically in the same way as a network. Consequently, there is the possibility to be altered and to be referred to in the contents of the boot disk by other computers.

With respect to this issue, the disk array device uses a WWN (World Wide Name) which is a unique device identifier (ID) (also called network identity information or device identity information) stored inside a Host Bus Adapter (HBA) which is a Fibre Channel network adapter that the computer has and has the function of performing an association between the WWN possessed by some specific computer and a disk inside a disk array device. For example, it functions to restrict (limit) the range of access such that only disk 1 can be accessed from a computer 1 having a WWN1 even if the computer accesses a disk array device. A function providing this kind of zone or group is also called zoning or host grouping, and by using this zoning, it has become possible to maintain security with respect to access to disks shared between computers. This kind of technology is disclosed in U.S. Patent Application Publication No. 2004/0059816 A1.

As for the maintenance, reconfiguration and so forth of computer systems, it is common, by making an operating schedule in advance and, based on the information defined in the schedule, performing the deployment of functions (system programs: including business application and the Operating System (OS)) of computers constituting the computer system, and booting these, to have computers execute the same functions, this kind of maintenance being performed by human intervention. Regarding the contents of technology related to this kind of booting and deployment, a disclosure is made in U.S. Patent Application Publication No. 2005/0010918A1.

Generally, the boot disk settings in the computers and the security settings in the disk array have been performed by manual work of the system operations administrator, and since the WWN is modified when the computer changes, a setting of the host group in the disk array device is necessary each time, so there has been the issue that the time and the effort are necessary to operate. Moreover, even in the case that the business operations executed on the computers (system programs) are modified, since there arise modifications in the boot disks and modifications in the configuration of the disks which are the object of that processing, a modification of the host group in the disk array device becomes necessary.

SUMMARY OF THE INVENTION

It is an object of the present invention to simplify the setting of computer systems.

In general, system programs to be booted are decided upon prior to the start of operations, so the disk configuration to be utilized is also determined. If one considers the simplification of operations, it is desirable to be able to modify the computers executing the same system programs. Consequently, a modification of the host group on the disk array side becomes unnecessary if the WWN of the same computer is handed over, even if there is a modification in a computer executing system programs.

From the foregoing, in the present invention, respective WWN which can be allocated to a plurality of computers, program names of programs to be booted, and area identity information of areas inside the aforementioned storage system in which the programs are stored, are associated and stored. In response to the entry of a boot request including the program name of the designated computer to be booted, the WWN and the area identity information corresponding to the program name are sent to the computer in order to boot the program. In the aforementioned computer, the transmitted WWN is set, and the area identity information is set as the booting area. Subsequently, by means of a restart of the aforementioned computer, the program stored in the area is booted to operate.

Other objects, features and advantages of the invention will become apparent from the following description of the embodiments of the invention taken in conjunction with the accompanying drawings.

BRIEF DESCRIPTION OF THE DRAWINGS

FIG. 3 is a block diagram of a disk mapping table.

FIG. 4 is a block diagram of a boot management table.

FIG. 5 is a block diagram of a server management table.

DETAILED DESCRIPTION OF THE EMBODIMENTS

Below, the embodiments of the present invention will be explained.

Figure 1:
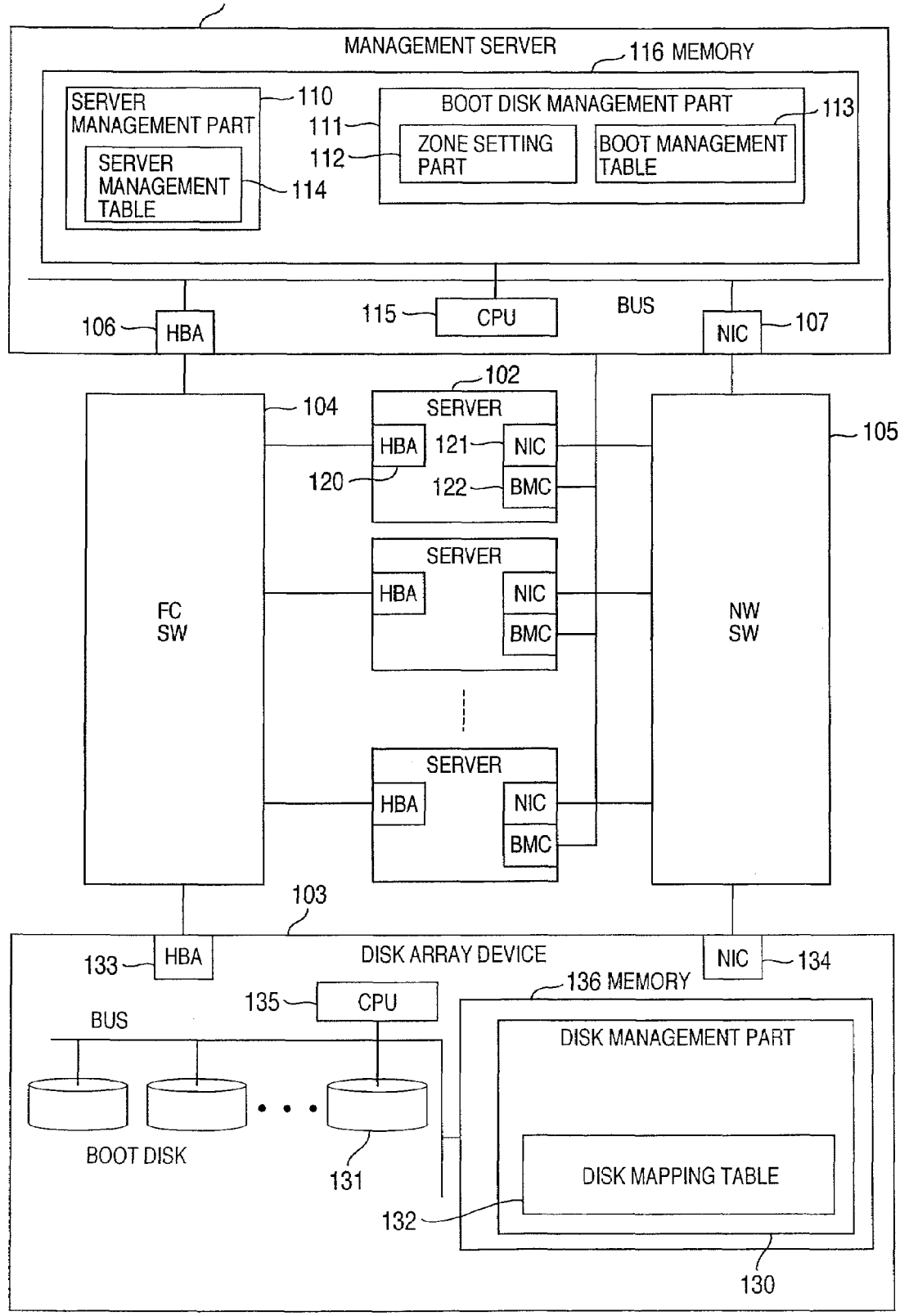
FIG. 1 is a general block diagram showing the first embodiment pertaining to the present invention.

FIG. 1 shows a computer system of an embodiment in the present invention. A plurality of servers 102 are connected to a network switch (NS SW) 105 via Network Interface Cards (NIC) 121 and are connected to a Fibre Channel switch (FC SW) 104 via Fibre Channel Host Bus Adapters (HBA) 120. Moreover, Fibre Channel switch 104 is also connected to a disk array device 103 and can be accessed from servers 102. Network switch 105 is also connected to a management server 101 managing the system. In addition, servers 102 are equipped with BMC (Baseboard Management Controllers) 122 which, via the network, enable condition monitoring and power control of the hardware of server 101. Management server 101 performs condition monitoring and, as needed, control via the network, with respect to servers 102, disk array device 103, Fibre Channel switch 104, and Network Switch 105. Management server 101 has programs of a server management part 110 and a boot disk management part 111 stored in a memory 116 and is provided with a CPU 115, an HBA 106, and a NIC 107 executing these programs. Servers 102 and management server 101 can be implemented in a computer or also in an information processing device.

When there occurs a fault in servers 102, server management part 110 performs collection and management of management information of each server such as the reception of fault reports from BMC 122, power control to BMC 122, and system programs executed in each server. Boot disk management part 111 is a processing part performing control and the like of a disk management part 130 of disk array device 103 and is one distinguishing feature of the present embodiment. Disk management part 130 in disk array device 103 has a function of setting the host group controlling the servers 102 able to access a disk 131 and performs the attachment of, and stores in a disk mapping table 132, relationships of HBA 120 loaded in servers 102 and disk 131. The setting of disk mapping table 132 of disk array device 103 is performed by a zone setting part 112 of boot disk management part 111. In the present embodiment, servers 102 utilize disk 131 inside disk array device 103 as the boot disk, the OS and system programs including business applications and the like being stored on disk 131. Each processing part (110, 111, 112, 130, 203, 204, 207) described above can be implemented with hardware or programs. Also, each processing part can be implemented by objects, threads, processes, or the like. Servers 102 can also utilize blades in blade systems. Management server 101 may be one of the blades. Also, management server 101 may be a service processor used for maintenance in blade systems.

Figure 2:
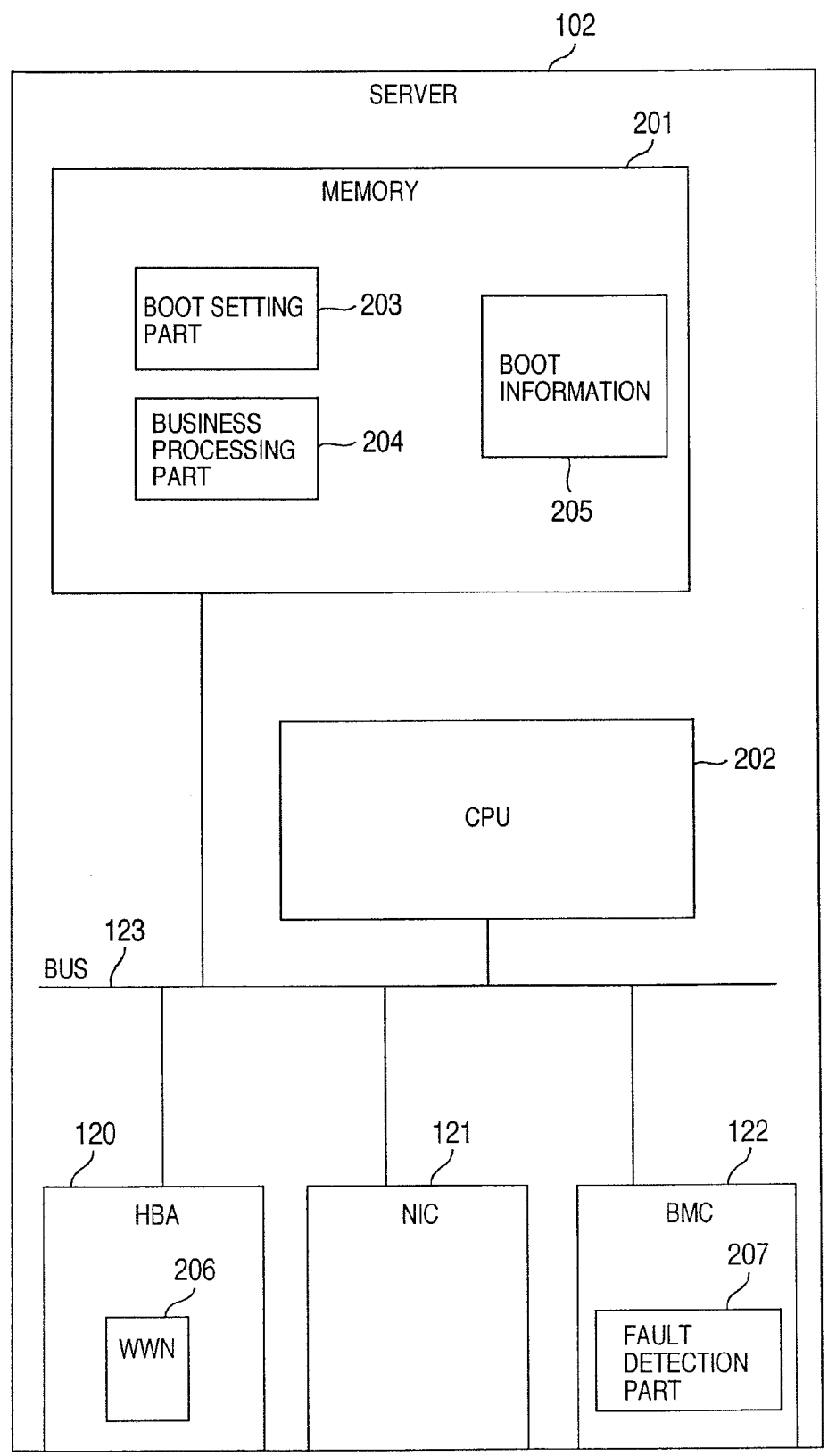
FIG. 2 is a block diagram of a server.

FIG. 2 shows the detailed configuration of a server 102 in the present embodiment. Server 102 consists of a memory 201 storing the programs of a boot setting part 203, a business processing part 204, and the like, and data such as boot information 205, a CPU 202 executing the programs in memory 201, an HBA 120, an NIC 121, and a BMC 122. In HBA 120, a unique device identifier (ID) called a WWN (World Wide Name) 206 (also called device identity information or network identity information) required in order to specify an identity of each element in Fibre Channel networks is stored in the memory of HBA 120.

BMC 122 mainly performs monitoring and control of the hardware of server 102. In case an anomaly occurs in the hardware of server 102, it is possible for a fault detection mechanism 207 to detect it and notify it externally. Also, on/off the power supply, shutting-down and restart (hardware reset or software reset) operation of server 102 is possible from management server 101 via BMC 122.

Boot setting part 203 receives the WWN transmitted from management server 101 and area identity information showing the boot disk via NIC 121. Next, the received WWN is set in HBA 120 and the area identity information is set in boot information 205. Business processing part 204 refers to boot information 205, accesses, via HBA 120, the disk indicated by the area identity information for specifying the area in which the program to be booted is stored, boots the program which is stored in the area, and performs the business operation by executing the system programs including business applications. For the boot setting part 203 and business processing part 204 execution, a number of occasions and methods can be considered. One way is the method of transferring boot setting part 203 and business processing part 204 via the network at the time of starting server 102, using the network boot feature possessed by NIC 121. In this method, it is possible to switch business operations even if an OS is not installed in server 102. Also, as a second method, there is the method of installing boot setting part 203 and business processing part 204 at the time of installing the OS, automatically activating boot setting part 203 and business processing part 204 when activating the OS, and setting a state in which a request is received. In this method, the installation of an OS is always required, but as mentioned above, the mechanism becomes simpler, since the network boot mechanism becomes unnecessary. Moreover, in case a fault occurs and utilization is not possible, information indicating that a fault is occurred is stored.

FIG. 3 shows the details of a disk mapping table 132 of disk management part 130 in FIG. 1. Disk management part 130 makes a connection with disks and WWN, the identifiers of the HBA loaded in servers 102. This information is stored by disk management part 130 in disk mapping table 132. A column 301 shows the WWN of the HBA built into the server. A column 302 shows logical disk numbers which are virtual disk numbers for the disks corresponding to WWN. A column 303 shows the physical disk numbers of the same disks. The logical disk numbers are virtual disk numbers (or area identifiers) which are utilized when specifying the areas accessed by server 102 and can be set regardless of the physical disk numbers. In the present example, it is shown that LUN0, LUN1, and LUN2 are allocated to WWNS5, and for the physical disk numbers thereof, LU31, LU32, and LU33 are allocated. The disk numbers correspond to information for designating disk areas storing programs and data and, not being limited to numbers, may be addresses or indirect addresses.

FIG. 4 shows the details of a boot management table 113 of boot disk management part 111 in FIG. 1. Boot disk management part 111 allocates WWN 402 to be set in the HBA built into the servers and logical disk numbers 403 showing boot disks with respect to business identifiers 401, which correspond to system program (including business application) identity information. If the system programs which are executed by server 102 are determined, WWN 402 for the HBA which accesses disk array device 103 and logical disk numbers 403 of the disk to be booted are determined, so boot disk management part 111 can transmit WWN 402 and logical disk numbers 403 to servers 102. In the present example, it is shown that WWNS4 and LUN2 are allocated to system program P5. In other words, it is shown that the OS and the business applications required to provide system program P5 are stored in the aforementioned LUN2.

By booting LUN2 as the boot disk, it becomes possible for a server 102 to perform system program P5.

FIG. 5 shows the details of a server management table 114 of server management part 110 in FIG. 1. Server management part 110 performs condition monitoring of servers 102 and performs the operation status monitoring and the fault monitoring and the power control of servers 102. When a fault occurs in a server, if a fault is detected in BMC 122 shown in FIG. 1 or the server, server management part 110 is notified of the occurrence of the fault. A column 501 shows server identifiers which are the identifiers of servers 102, a column 502 shows an executed business ID, a column 503 shows WWN set in the HBA of servers 102, and a column 504 shows booted logical disk numbers. In the present example, it is shown that a system program P3 is executed in server S1, WWNS3 is set in the HBA, and the boot logical disk number is LUN3.

Figure 6:
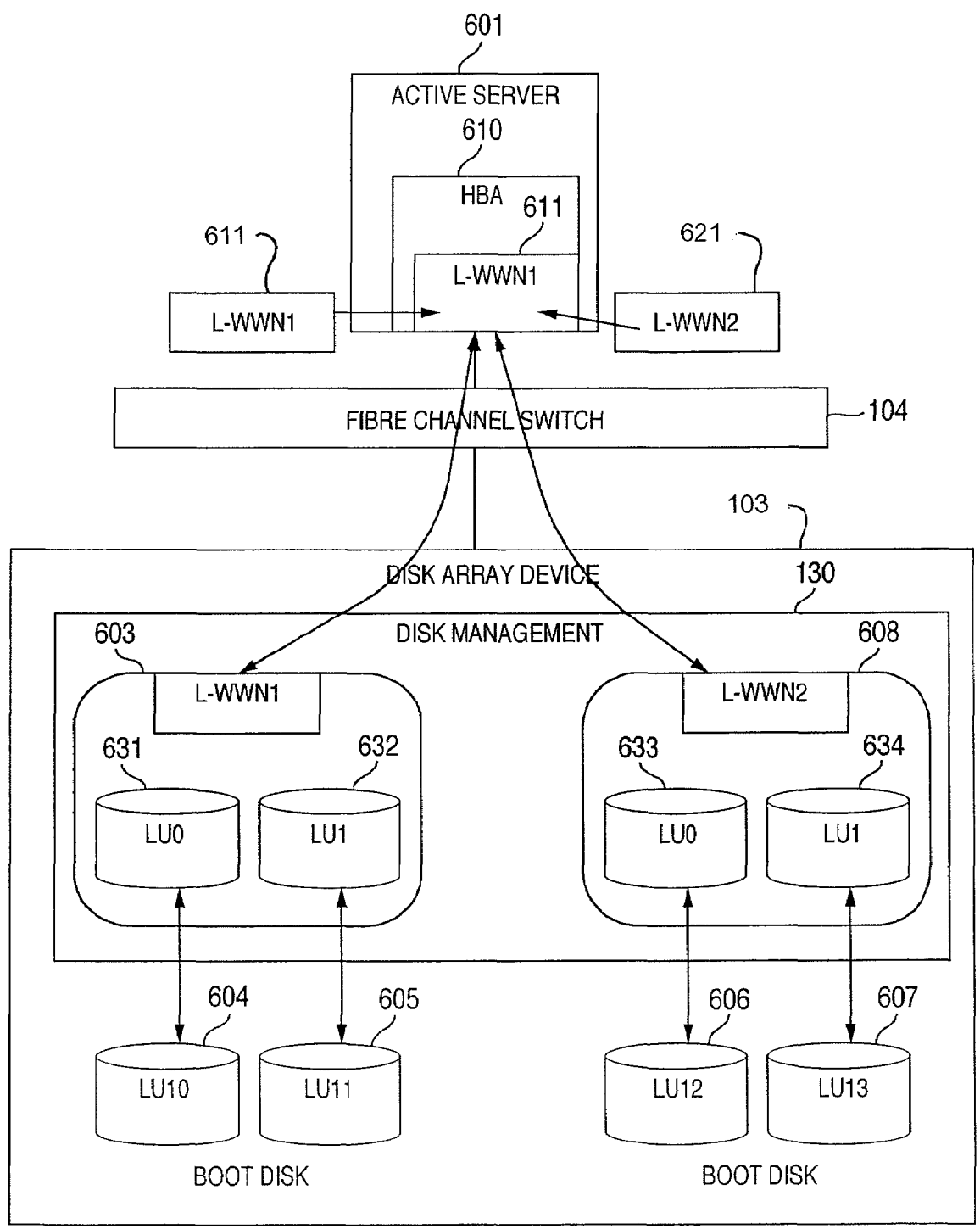
FIG. 6 shows an example of a switchover of system programs.

FIG. 6 shows an example of a system program modification in the present embodiment. An HBA 610, built into an active server 601 which is one machine within server 102, has an L-WWN1 611. These are connected to disk array device 103 via Fibre Channel switch 104. The mapping of the disks is controlled by disk management part 130, virtual disk group 603, including virtual disks 631, 632, being mapped to L-WWN1 611 of active server 601. The substance of logical disks 631, 632 is the physical disks 604, 605 which have boot disks included in which OS and business applications are installed. In case there has been a switchover of system programs, the disk mapping is modified by overwriting L-WWN1 611 of active server 601 with L-WWN2 621.

At this point, the mapping between active server 601 L-WWN1 611 and group 603 is released and mapping is carried out onto L-WWN2 621. In this way, it is possible for active server 601 to switch over to disks 633, 634 including OS and business applications performing a new system program. By starting standby server 601 in this state, it becomes possible for active server 601 to execute a new system program.

Figure 7:
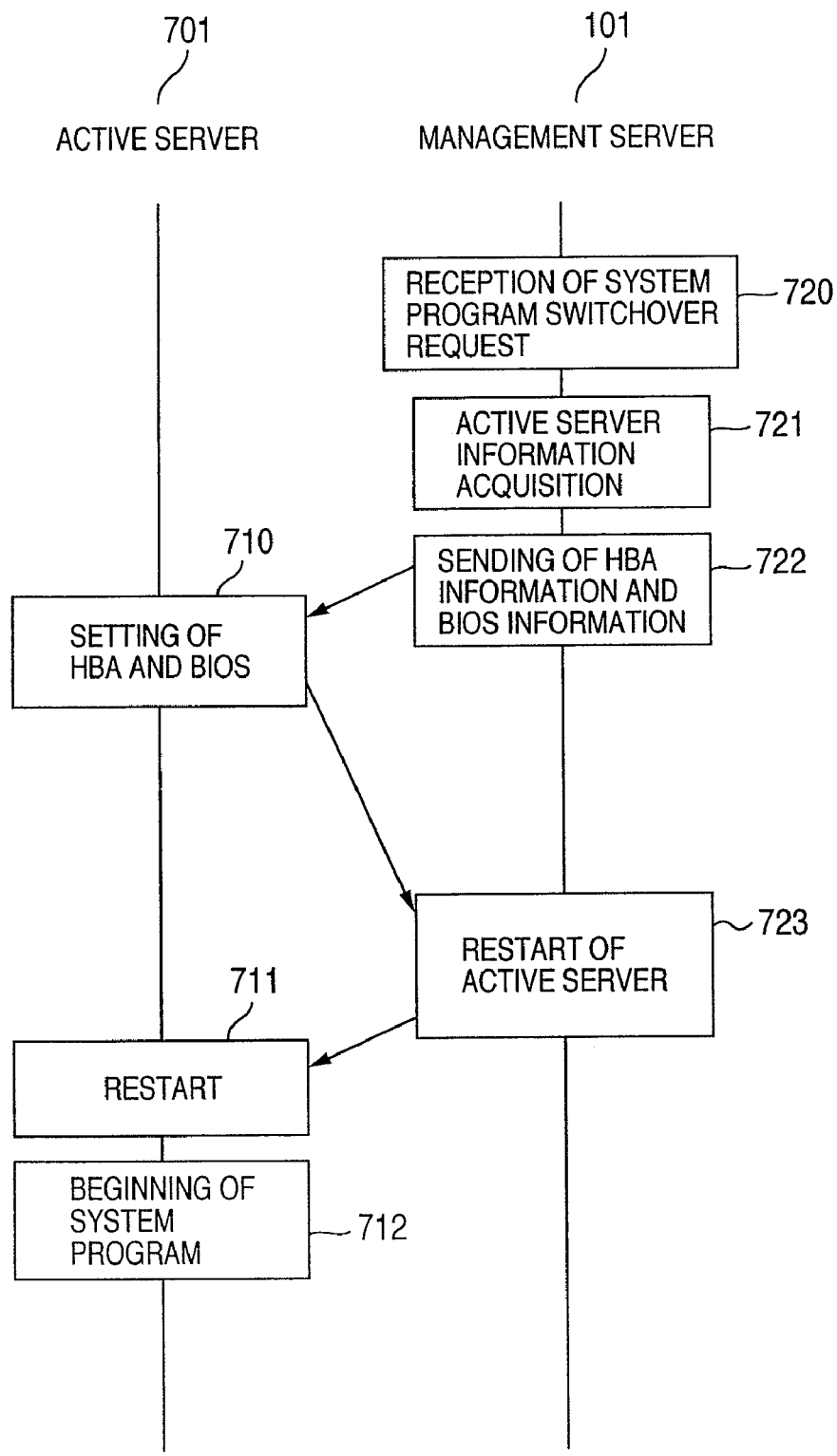
FIG. 7 shows system program switchover sequence.

FIG. 7 shows an example of an operating sequence of the present embodiment. The illustrated sequence shows the processing between an active server 701, which is one machine within server 102, and management server 101.

If management server 101 receives a system program switchover request including the name of the system program to be switched over from and the name of the system program to be switched over to (Step 720), it is determined, by referring to server management table 114, which server executes the same system program to be switched over from, and by referring to boot management table 113, a WWN is acquired as the HBA information pertaining to the system program to be switched over to and the boot logical disk number is acquired as BIOS information (boot information) (Step 721). Next, the WWN and the boot logical disk number are sent to the server (in the present example, active server 701) executing the system program to be switched over from (Step 722).

In active server 701, if a WWN is set in HBA and a boot logical disk number is set in the boot information, it is notified to management server 101 that settings have come to an end (Step 710).

When management server 101 receives the same notification, a restart request is sent to active server 701 (Step 723). When active server 701 receives the restart request, it begins the restart (Step 711). The active server refers to the boot information to start the boot from the set logical disk number, and after the boot, the system program to be switched over to is executed in active server 701. By performing in this way, the switchover of system programs can be accomplished without modifying the settings in disk array device 103.

Figure 8:
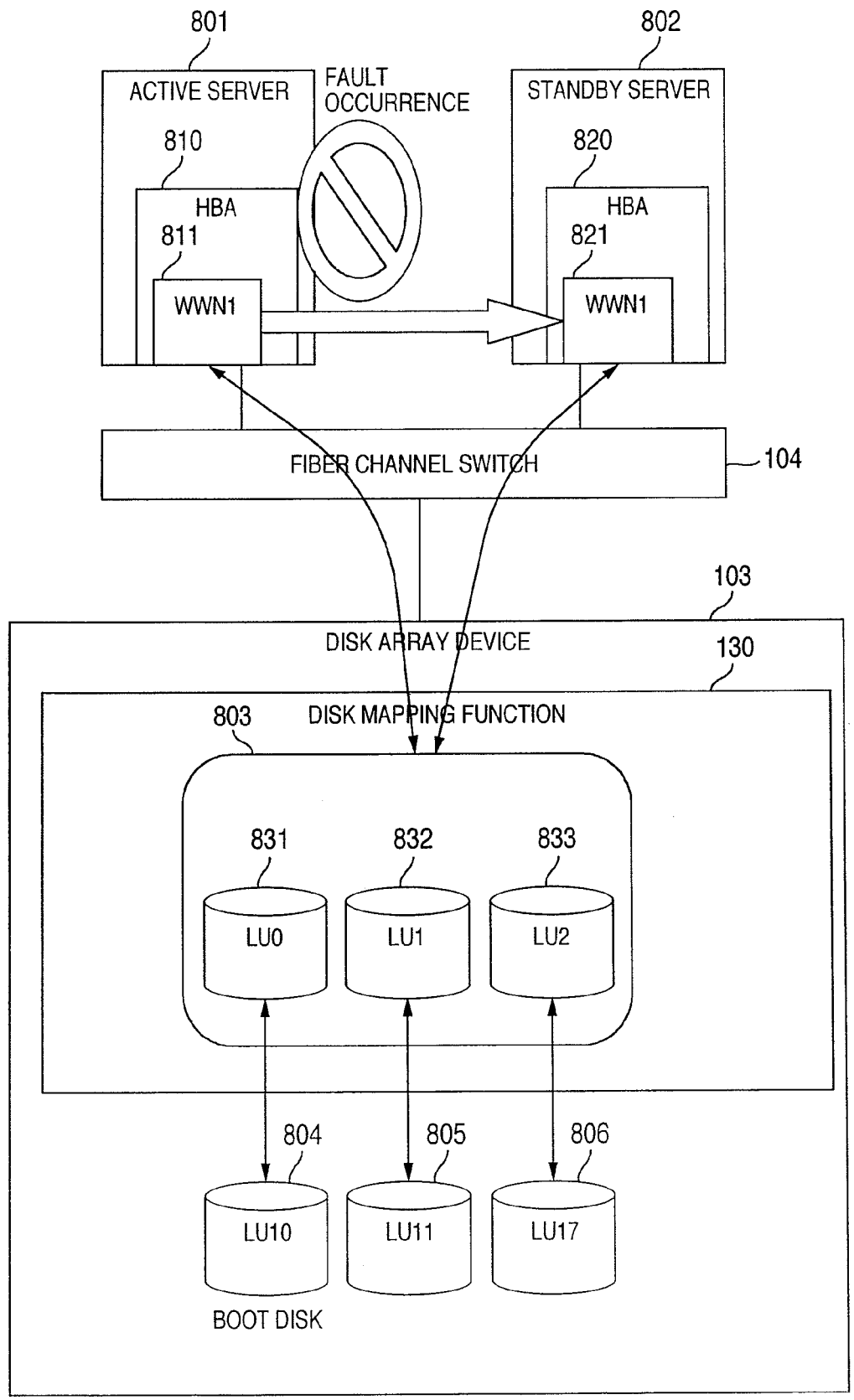
FIG. 8 shows an example of a system program failover.

FIG. 8 shows an example of a modification of a system program in the present embodiment. An HBA 810, which is built into an active server 801, has a WWN1 811. These are connected to disk array device 103 via Fibre Channel switch 104. The mapping of the disks is controlled by disk mapping function 130, virtual disk group 803 including virtual disks 831, 832, 833 being mapped to WWN1 811 of active server 801. The substance of virtual disks 831, 832, 833 is logical disks 804, 805, 806 which include boot disks on which OS and business applications are installed. In case a fault occurs in active server 801, the disk mapping is modified to a standby server 802. At this point, the mapping between WWN1 811 of active server 801 and virtual disk group 803 is released, and by setting a WWN1 821 in standby server 802, it is possible to make a mapping onto standby server 802. In this way, standby server 802 can take over the disks including the OS and business applications utilized by active server 801. By starting standby server 802 in this state, a failover of system programs from active server 801 is implemented.

Figure 9:
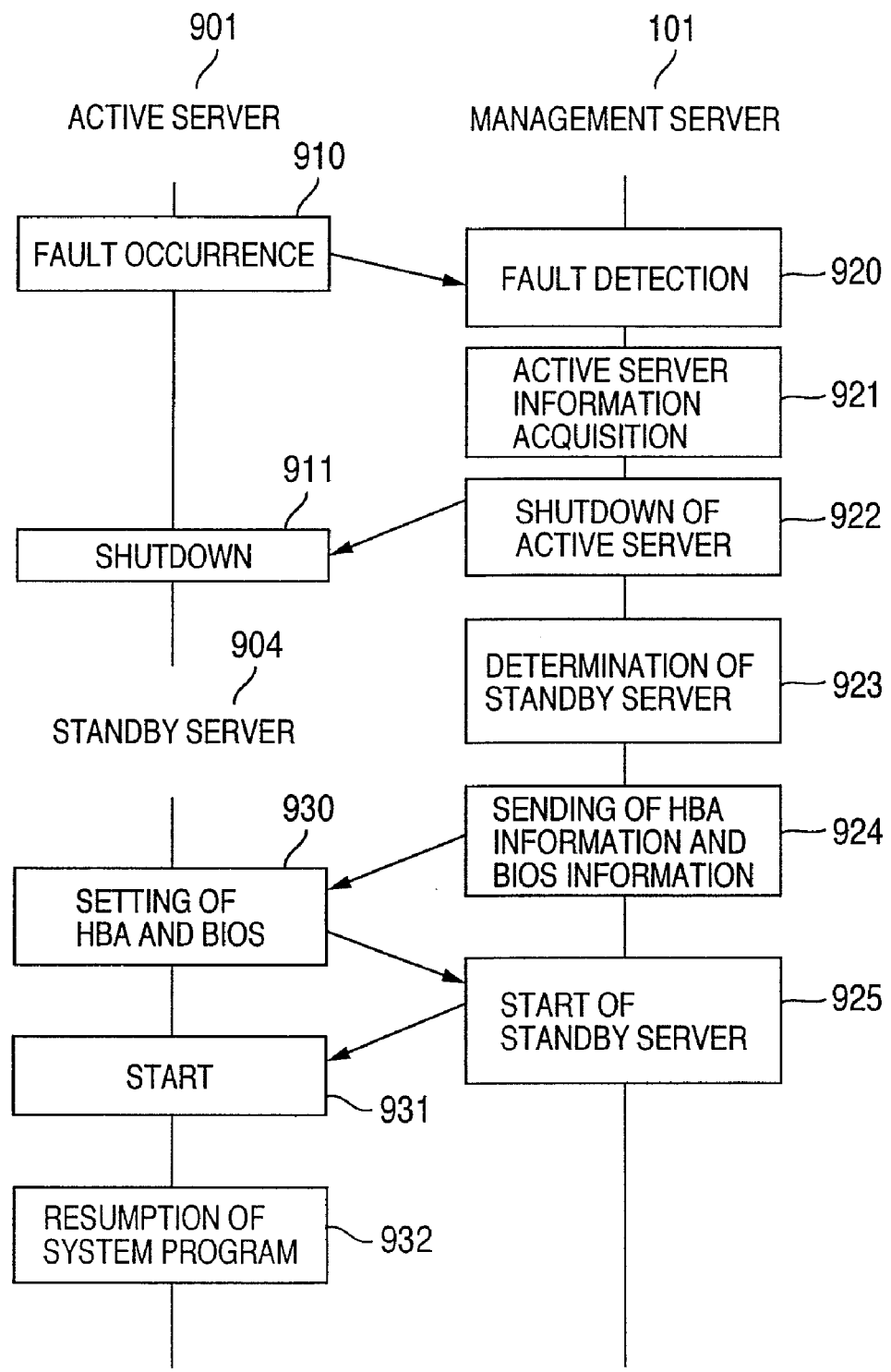
FIG. 9 shows a system program failover sequence.

FIG. 9 shows an operating sequence of an embodiment in the present invention. The illustrated sequence involves an active server 901, a management server 101, and a standby server 904. Step 910 shows the occurrence of a fault in the active server. The occurrence of the fault is detected in the BMC built into active server 901 and is notified to management server 101. In Step 920, management server 101 detects the detected fault. In Step 921, information on the WWN of active server 901, the boot logical disk number and the like is acquired. This information is acquired from server management table 110.

In Step 922, active server 901 is shut down. If active server 901 is left operating, there are cases where the OS and the business applications operate under unstable conditions, and they may issue improper inputs and outputs.

Further, the moment the standby server takes over the system programs, if the active server is still working, the result is that servers having the same IP address coexist. In order to prevent this, a shutdown of active server 901 is necessary. However, in case active server 901 is during dump processing, the shutdown is not executed until dump processing has come to an end.

Moreover, there are also cases where management server 101 makes a request to active server 901 for the activation of dump processing. In Step 911, active server 901 receives a shutdown request and executes shutdown processing. In case shutdown processing is impossible, management server 101 executes force cut off the power supply of active server 901. The force cut off of the power supply is executed giving an instruction with respect to the BMC built into the server. In Step 923, a search is carried out for a standby server capable of taking over the system programs, based on the active server information acquired in Step 921. It is implemented by referring to server management table 114 to search for an available server. As a result of the search, the discovered server is taken to be standby server 904. In Step 924, a WWN is acquired as the HBA information set in active server 901, and a boot logical disk number is acquired as the BIOS information, from server management table 114. Next, the WWN and the boot logical disk number are sent to the determined standby server 904 (Step 924).

In standby server 904, when a WWN is set in the HBA and a boot logical disk number is set in the boot information, it is notified to management server 101 that the settings have come to an end (Step 930).

When management server 101 receives that notification, it sends a restart request to standby server 904 (Step 925). When standby server 904 receives the restart request, it begins a restart (Step 931). The active server refers to the boot information, begins the boot from the set logical disk number, and after the boot, the system programs to be switched over to are executed in active server 701 (Step 932).

By the processing in this way, it becomes possible, since the OS and the business application are activated, to resume the system programs.

According to the present invention, it is possible to simplify the operation of a computer system by reducing the setting operation steps required on the storage system side.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system comprising:
    a plurality of computers having at least one active computer and at least one standby computer;
    a management computer adapted to manage the plurality of computers; and
    a storage system;
    the management computer including:
        a portion adapted to receive network identification information which is set to a network adapter of the active computer;
        a portion adapted to receive area identification information which is set as boot information of the active computer; and
        a portion adapted to transmit the network identification information and the area identification information, of the active computer, to the standby computer if the management computer detects a fault of the active computer;
    the standby computer including:
        a portion adapted to set the network identification information of the active computer to a network adapter of the standby computer;
        a portion adapted to set the area identification information of the active computer as a boot information of the standby computer;
        a portion adapted to receive at least one program which is indicated by the area identification information, from a storage area of the storage system; and
        a portion adapted to boot the program.

2. The computer system according to claim 1, wherein the management computer comprising:
    computer management information adapted to store active computer identification information and the network identification information set to a network adapter, of each active computer, in correspondence with each other;
    wherein the portion adapted to receive the network identification information, receives the network identification information based on the computer management information.

3. The computer system according to claim 1, wherein the storage system comprising:
    storage mapping information adapted to store each network identification information and corresponding storage area identification information, in correspondence with each other, wherein the storage area identification information identifies at least one storage area of the storage system; and,
    an access control portion adapted to receive an access request indicating an assigned network identification information from any network adapter, and to allow access if the access request is for the at least one storage area corresponding to the assigned network identification information, and to deny access if the access request is for the at least one storage area not corresponding to the assigned network identification information.

4. The computer system according to claim 1, wherein the management computer comprising:
    a portion adapted to execute at least one of a shut-down or a power-off of the active computer, if the management computer detects a fault of the active computer.

5. The computer system according to claim 1, wherein the active computer comprising:
    a baseboard management controller adapted to detect a fault of the active computer, and to inform the fault to the management computer.

6. The computer system according to claim 1, wherein the management computer comprising:
    a portion adapted to search for at least one standby computer from a plurality of standby computers, and to set one of the at least one standby computer as the standby computer.

7. The computer system according to claim 1, wherein the program is an operating system (OS).

8. The computer system according to claim 1, wherein the network identification information is a world wide name (WWN), and the network adapter is a host bus adapter (HBA).

9. The computer system according to claim 1, wherein the storage area is at least one of a logical disk or a physical disk of the storage system.

10. A method for operating a computer system having: a plurality of computers having at least one active computer and at least one standby computer; a management computer adapted to manage the plurality of computers; and a storage system, the method comprising:
    at the management computer:
        receiving network identification information which is set to a network adapter of the active computer;
        receiving area identification information which is set as boot information of the active computer; and
        transmitting the network identification information and the area identification information, of the active computer, to the standby computer if the management computer detects a fault of the active computer;
    at the standby computer:
        setting the network identification information of the active computer to a network adapter of the standby computer;
        setting the area identification information of the active computer as a boot information of the standby computer;
        receiving at least one program which is indicated by the area identification information, from a storage area of the storage system; and
        booting the program.

11. The method according to claim 10, comprising:

the management computer having management information adapted to store active computer identification information and the network identification information set to a network adapter, of each active computer, in correspondence with each other;

wherein the operation of receiving the network identification information, receives the network identification information based on the computer management information.

12. The method according to claim 10, comprising the storage system:

saving storage mapping information adapted to store each network identification information and corresponding storage area identification information, in correspondence with each other, wherein the storage area identification information identifies at least one storage area of the storage system; and, receiving an access request indicating an assigned network identification information from any network adapter, and allowing access if the access request is for the at least one storage area corresponding to the assigned network identification information, and denying access if the access request is for the at least one storage area not corresponding to the assigned network identification information.

13. The method according to claim 10, wherein the management computer:

executing at least one of a shut-down or a power-off of the active computer, if the management computer detects a fault of the active computer.

14. The method according to claim 10, wherein the active computer comprising:

a baseboard management controller detecting a fault of the active computer, and informing the fault to the management computer.

15. The method according to claim 10, wherein the management computer:

searching for at least one standby computer from a plurality of standby computers, and setting one of the at least one standby computer as the standby computer.

16. The method according to claim 10, wherein the program is an operating system (OS).

17. The method according to claim 10, wherein the network identification information is a world wide name (WWN), and the network adapter is a host bus adapter (HBA).

18. The method according to claim 10, wherein the storage area is at least one of a logical disk or a physical disk of the storage system.

\* \* \* \* \*

UNITED STATES PATENT AND TRADEMARK OFFICE
CERTIFICATE OF CORRECTION

| | | |
|---|---|---|
| PATENT NO. | : 7,334,027 B2 | Page 1 of 1 |
| APPLICATION NO. | : 11/759101 | |
| DATED | : February 19, 2008 | |
| INVENTOR(S) | : Nakajima et al. | |

It is certified that error appears in the above-identified patent and that said Letters Patent is hereby corrected as shown below:

Please add the following Items to the Title Page

--Item (30) Foreign Application Priority Data
December 12, 2005 (JP) ---------------- 2005-357118--.

--Item (62) Related U.S. Application Data
Continuation of application No. 11/366,560, filed on Mar. 03, 2006, now Pat. 7,321,927--.

Signed and Sealed this

First Day of July, 2008

JON W. DUDAS
*Director of the United States Patent and Trademark Office*